United States Patent [19]

Bruhnke et al.

[11] Patent Number: 4,838,599
[45] Date of Patent: Jun. 13, 1989

[54] TILTING ASHTRAY FOR MOTOR VEHICLES

[75] Inventors: Ulrich Bruhnke, Ehningen; Jurgen Korber, Sindelfingen; Ingo Jobmann, Grafenau, all of Fed. Rep. of Germany

[73] Assignee: Daimler-Benz Aktiengesellschaft, Stuttgart, Fed. Rep. of Germany

[21] Appl. No.: 150,011

[22] Filed: Jan. 29, 1988

[30] Foreign Application Priority Data

Jan. 29, 1987 [DE] Fed. Rep. of Germany ....... 3702554

[51] Int. Cl.⁴ .............................................. B60N 3/08
[52] U.S. Cl. ................. 296/37.9; 296/37.12; 220/18
[58] Field of Search ............. 296/37.9, 37.12; 220/18

[56] References Cited

U.S. PATENT DOCUMENTS 2,294,173  4/1942  Gillisse ........................... 206/19.5
2,505,324  4/1950  Hendricks ........................... 220/18
2,791,346  5/1957  Tell ..................................... 220/18
4,676,544  6/1987  Dabringhaus et al. ............ 296/37.9

FOREIGN PATENT DOCUMENTS 0073431   8/1982   European Pat. Off. .
0163181  11/1987   European Pat. Off. .
0957279   1/1957   Fed. Rep. of Germany .
1950424  11/1966   Fed. Rep. of Germany .
1166967   2/1968   Fed. Rep. of Germany .
1394469   2/1972   Fed. Rep. of Germany .
7906735   6/1979   Fed. Rep. of Germany .
2306601   3/1976   France .
0888353   1/1962   United Kingdom .

Primary Examiner—Robert R. Song
Attorney, Agent, or Firm—Barnes & Thornburg

[57] ABSTRACT

A tilting ashtray for motor vehicles, the facing part of which is milled out of a facing plate covering the surroundings, has a burning-ash protection strip which is integrally formed closely beneath an upper-lying milled-through transverse gap onto the facing part.

5 Claims, 1 Drawing Sheet

TILTING ASHTRAY FOR MOTOR VEHICLES

BACKGROUND AND SUMMARY OF THE INVENTION

The invention relates to a tilting ashtray for motor vehicles of the type having a cup housing tiltable to a limited extent into the interior vehicle space to uncover the ashtray opening.

It is known from the state of the art (used in Mercedes vehicles) to cover the upper edge of the front end of a cup part of a tilting ashtray together with its facing part by a burning-ash protection strip which is clipped on in this location and possibly also has to be adhesively bonded. On account of the necessity of a reliably adhering protection against damage caused by burning ash falling onto the upper edge, it is essential that the attached burning-ash protection strip is also completely taken around the upper edge, and the facing surface pointing towards the interior space of the vehicle is thus partly covered. This generally disturbs the uniform facing pattern. In addition, further expense is entailed by attempting to advantageously form the visible transition from the burning-ash protection strip to the refined surface of the facing.

An object of the invention is to design a cup housing of a tilting ashtray for motor vehicles in such a manner that, at its upper edge pointing towards the interior space of the vehicle in the opened state, it is protected against the influence of temperature, which cup housing has a front end covered by a facing part which is separated by milled encompassing gaps from a facing plate covering the surroundings.

This object is achieved by integrally forming the burning-ash protection strip onto a temperature-resistant facing part.

As a result of the burning-ash protection strip integrally formed onto a temperature-resistant facing part, the refined surface of the latter pointing towards the interior space of the vehicle is in no way impaired in its overall pattern. The operation to provide the facing plate with an integrally formed burning-ash protection strip, to improve the appearance of the surface, e.g., by a veneer, and then to cut out the facing part leads to a low-cost production method.

Other objects, advantages and novel features of the present invention will become apparent from the following detailed description of the invention when considered in conjunction with the accompanying drawings.

DETAILED DESCRIPTION OF THE DRAWINGS

Figure 1:
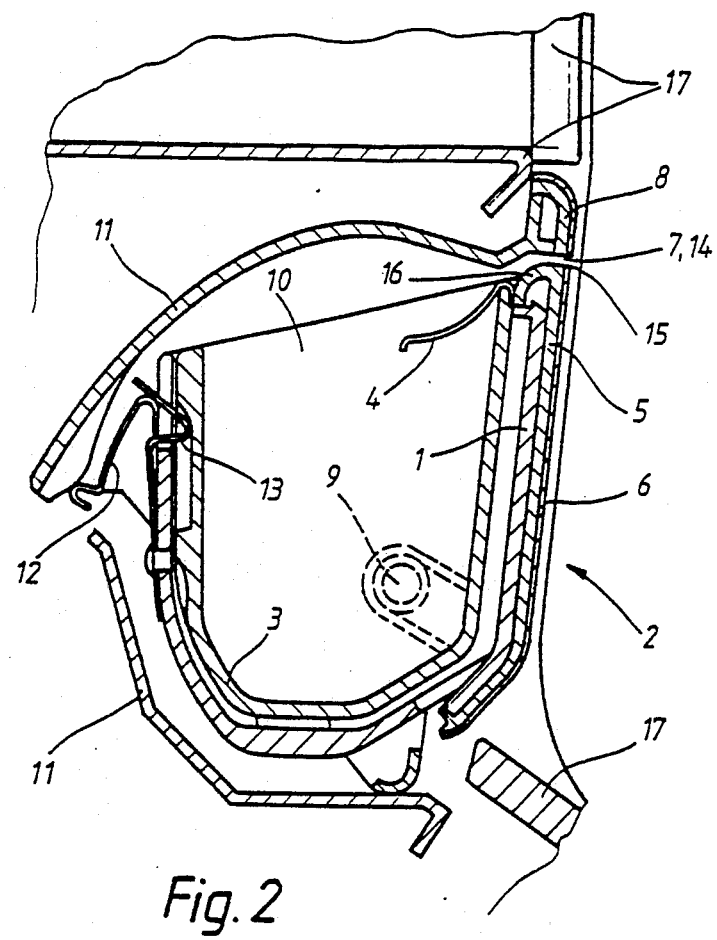
FIG. 1 is a schematic cross sectional view of a tilting ashtray according to the invention with a burning-ash protection strip integrally formed into the facing.

FIG. 1 shows a cup housing 1 of a tilting ashtray 2 which accommodates an ashtray insert 3 with a burning ash deadener 4, and its front end is covered by a facing part 5 onto which a veneer 6 is applied for surface refinement.

This facing part 5 is separated by milled, encompassing gaps 7 from a facing plate 8 covering the surroundings and constructed in the same manner.

The tilting ashtray 2, which is automatically pivoted to a limited extent about a pivot pin 9 towards the interior space of the vehicle by a mechanism (not shown) already known via a pressure application on the front end of the facing part and thereby uncovers an ashtray opening 10, is located in an ashtray frame 11 on which the cup housing 1 is interlocked via riveted spring 12 while a further catch spring 13 holds the ashtray insert 3.

In such a manner that it points towards the ashtray opening 10, a burning-ash protection strip 16 is integrally formed onto the facing plate 5 in the area of the upper edge 15 of the latter determined by an upper-lying, milled-through transverse gap 14.

Up to the upper edge 15, the facing part 5 is covered on the front end by the veneer 6 which likewise covers the adjoining areas or is supplemented by further console parts 17 to form a unit.

Figure 2:
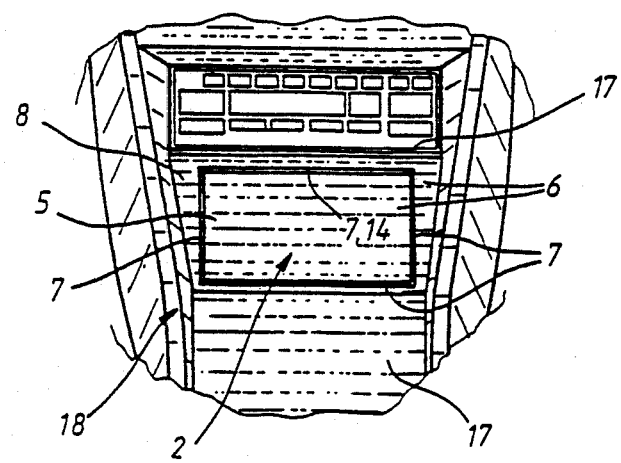
FIG. 2 shows in front view, a motor vehicle console with an installed tilting ashtray according to the invention.

FIG. 2, in front view, shows a tilting ashtray 2 according to the invention, the facing part 5 of which, with the facing plate 8 which surrounds it and is inside the console 18, presents a uniform pattern, since the surface is veneered as a whole, and the facing part 5 is then cut out by a milling operation.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Tilting ashtray for motor vehicles which comprises a cup housing which can be tilted to a limited extent towards the interior space of the vehicle for uncovering an ashtray opening, a cup housing surface facing the interior space of the vehicle which is covered by a surface-refined, temperature resistant facing part separated by milled-through encompassing gaps from a facing plate which covers the surroundings, and an upper edge of the cup housing surface which protrudes in the opened stated into the interior space of the vehicle being protected against temperature effects by a rounded-off burning-ash protection strip which is integrally formed, closely beneath an upper-lying milled-through transverse gap, with the temperature-resistant facing part in such a manner that the protection strip extends towards the ashtray opening from the facing part to protect the upper edge of the cup housing surface.

2. Tilting ashtray for motor vehicles according to claim 1, wherein the facing part, is covered by a veneer matching a corresponding veneer on adjacent parts.

3. A method of making a tilting ashtray for motor vehicles which comprises a cup housing which can be tilted to a limited extent towards the interior space of the vehicle for uncovering an ashtray opening having a cup housing surface facing the interior space of the vehicle which is covered by a surface-refined, temperature resistant facing part separated by milled-through encompassing gaps from a facing plate which covers the surroundings, and an upper edge of the cup housing surface which protrudes in the opened state into the interior space of the vehicle being protected against temperature effects by a rounded-off burning-ash protection strip wherein the burning-ash protection strip is integrally formed, closely beneath an upper-lying milled-through transverse gap, with the temperature-resistant facing part in such a manner that the protection strip extends towards the ashtray opening from the facing part to protect the upper edge of the cup housing surface.

4. Tilting ashtray according to claim 1, wherein the rounded-off, burning-ash protection strip extends downwardly from an upper edge of the temperature resistant facing part towards the ashtray opening and covers the upper edge of the cup housing surface.

5. Tilting ashtray according to claim 3, wherein the rounded-off, burning-ash protection strip extends downwardly from an upper edge of the temperature resistant facing part towards the ashtray opening and covers the upper edge of the cup housing surface.

* * * * *